(No Model.)

E. ODELL.

NUT LOCK.

No. 283,505. Patented Aug. 21, 1883.

Witnesses,
Geo H Strong
J H Rouse

Inventor,
Edwin Odell
By
Dewey & Co.
Attorneys

UNITED STATES PATENT OFFICE.

EDWIN ODELL, OF ELKO, NEVADA.

NUT-LOCK.

SPECIFICATION forming part of Letters Patent No. 283,505, dated August 21, 1883.

Application filed March 19, 1883. (No model.)

*To all whom it may concern:*

Be it known that I, EDWIN ODELL, of Elko, county of Elko, State of Nevada, have invented an Improved Nut-Lock; and I hereby declare the following to be a full, clear, and exact description thereof.

My invention relates to a new and useful nut-lock; and it consists in a nut having a spring pawl or pin adapted to engage with a washer having depressions on one side to receive the pin, and projections on the other side whereby it is secured to the bed-plate, the head of said pin being supported by a small perforated plate, as will hereinafter fully appear, reference being made to the accompanying drawings, in which—

Figure 1:
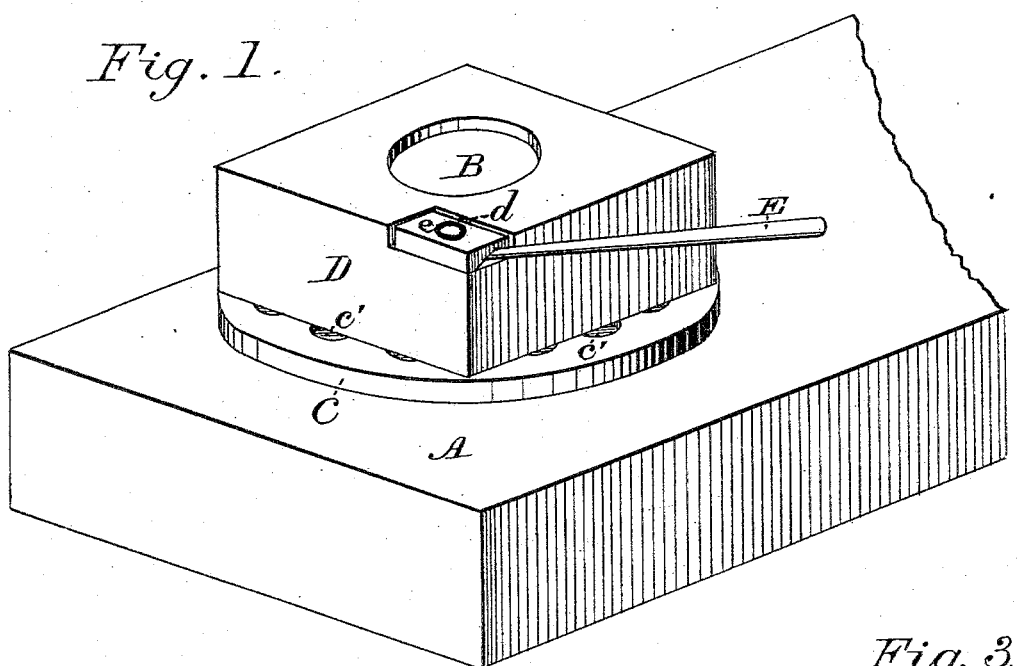
Figure 2:
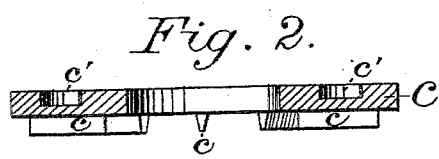
Figure 3:
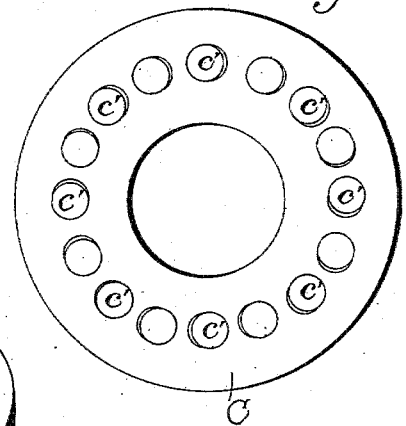
Figure 4:
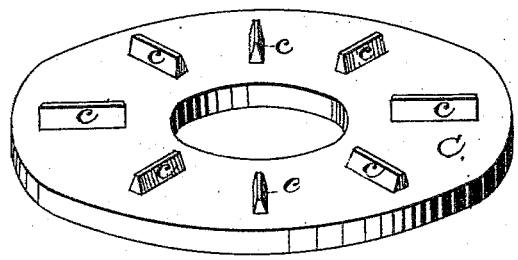
Figure 5:
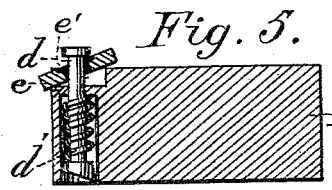

Figure 1 is a perspective view of my nut-lock. Fig. 2 is a section of the washer C. Fig. 3 is a plan of the washer C, showing the depressions $c'$. Fig. 4 is a perspective view of the washer, showing the teeth $c$. Fig. 5 is a section through nut D, showing the pin $d$ raised.

The object of my invention is to prevent the nut from working loose on its screw or bolt and hold it firmly to its place.

A is a bed-plate having a bolt, B.

C is a washer, one side of which is provided with projections $c$; or it may be toothed, as a ratchet, if preferred, Fig. 4. Its other side is provided with depressions $c'$, Fig. 3.

D is the nut. In one corner is fitted a pawl, $d$, passing through loosely, and having a surrounding spring, $d'$, to hold its lower or inner end projected, while its head is provided with a plate, $e$, let into the face of the nut to be out of the way. This plate has in its upper or outer surface a depression, $e'$, for receiving the head of the pawl $d$, which depression is made somewhat larger than said head, in order that when the plate is tilted by means of pin E and turned cornerwise, so as to hold the pawl $d$ up, the head may rest in said depression without binding. The engaging end of the pawl or pin is beveled to adapt it to slip one way and catch the other. When the nut is screwed up on the bolt, it presses the washer into the bed-plate. If this latter be of wood, the teeth or projections $c$ sink into it easily; or, if of iron or other metal, its surface should be slightly corrugated, in order to allow the projections to engage with them. Thus the washer is secured, and the pawl or pin $d$ of the nut engages with the depressions $c'$ on its face and secures the nut. By having the depressions all around the face of the washer, the pawl is enabled to engage with them at any point, and therefore the nut may be turned up as tightly as desired. In turning up its pawl slips, but in turning back it engages, so that it cannot work loose. In order to release it, I have a small pin, E, here shown as being introduced under the plate-head $e$ of the spring-pawl, Fig. 1. By this means the pawl is raised or forced out of engagement and the nut may be turned.

A ratchet-face on the washer would answer the purpose of locking the nut; but I prefer to make the depressions distinct, as shown.

Having thus described my invention, what I claim as new, and desire to secure by Letters Patent, is—

A lock-nut device consisting of the bed-plate A, bolt B, washer C, having rear teeth, $c$, engaging with the bed-plate, and front depressions, $c'$, the nut D, having a spring pawl or pin, $d$, in one corner engaging with the depressions in the washer, said pawl or pin having a head, and the plate $e$, having depressions $e'$, and releasing-pin E, substantially as herein described.

In witness whereof I hereunto set my hand.

EDWIN ODELL.

Witnesses:
S. H. NOURSE,
J. H. BLOOD.